(12) United States Patent
Hosokawa (10) Patent No.: US 7,113,621 B2
(45) Date of Patent: Sep. 26, 2006

(54) FINGERPRINT VERIFYING APPARATUS OF SMALL SIZE AND METHOD OF OPERATING THE SAME

(75) Inventor: Satoshi Hosokawa, Tokyo (JP)

(73) Assignee: NEC Corporation, Tokyo (JP)

(*) Notice: Subject to any disclaimer, the term of this patent is extended or adjusted under 35 U.S.C. 154(b) by 888 days.

(21) Appl. No.: 10/081,949

(22) Filed: Feb. 22, 2002

(65) Prior Publication Data

US 2002/0118865 A1    Aug. 29, 2002

(30) Foreign Application Priority Data

Feb. 28, 2001   (JP)   ............................. 2001-053709

(51) Int. Cl.
*G06K 9/00*   (2006.01)
(52) U.S. Cl. .................... 382/124; 283/68; 356/71; 340/5.53; 340/5.83
(58) Field of Classification Search ........ 382/115–116, 382/124, 127; 283/67–70; 356/71; 340/5.52, 340/5.53, 5.8, 5.81, 5.82, 5.83
See application file for complete search history.

(56) References Cited

U.S. PATENT DOCUMENTS 4,995,086 A * 2/1991 Lilley et al. ................ 382/124
5,801,681 A * 9/1998 Sayag ........................ 345/157
6,433,818 B1 * 8/2002 Steinberg et al. ........... 348/161

FOREIGN PATENT DOCUMENTS

| CN | 2201059 Y | 6/1995 |
| CN | 2401938 Y | 10/2000 |
| GB | 2 254 466 A | 10/1992 |
| JP | 6-176137 | 6/1994 |
| JP | 3032679 | 10/1996 |
| WO | WO 97/21197 | 6/1997 |

* cited by examiner

*Primary Examiner*—Bhavesh M. Mehta
*Assistant Examiner*—Manav Seth
(74) *Attorney, Agent, or Firm*—Scully, Scott, Murphy & Presser, P.C.

(57) ABSTRACT

A fingerprint verifying apparatus includes first and second light emitting devices, an imaging unit, a fingerprint verifying circuit and a drive switch. The first light emitting device emits first light of a first color, and the second light emitting device emits second light of a second color. The imaging unit detects an image of a fingerprint of a finger from the first light reflected by a finger. The fingerprint verifying circuit has registered fingerprint images, and compares the detected fingerprint image and each of the registered fingerprint images to determine whether the detected fingerprint image is coincident with any of the registered fingerprint images, and outputs a match signal when the detected fingerprint image is coincident with any of the registered fingerprint images. The drive switch turns on the second light emitting device in response to the match signal.

20 Claims, 5 Drawing Sheets

FINGERPRINT VERIFYING APPARATUS OF SMALL SIZE AND METHOD OF OPERATING THE SAME

BACKGROUND OF THE INVENTION

1. Field of the Invention

The present invention relates to a fingerprint verifying apparatus, and more particularly, to a fingerprint verifying apparatus of a small size and a method for operating the same.

2. Description of the Related Art

Verification of a fingerprint is carried out for entrance management. For this purpose, a fingerprint verifying apparatus is used and is of a fixed type. The fixed type fingerprint verifying apparatus is large in size. Equipment accommodating such a large-sized fingerprint verifying apparatus is also large in size. In order to reduce the equipment in size, the fingerprint verifying apparatus must be made small.

In conjunction with the above description, a fingerprint image input device is disclosed in Japanese Laid Open Patent application (JP-A-Heisei 6-176137). In this reference, the fingerprint image input device is comprised of an illumination section (1) for irradiating illumination light approximately vertically to the envelope surface of a finger. An imaging section (2) receives the light reflected and scattered by the finger. A finger putting section (3) has a piercing hole (9) in a position where the finger is putted. The illumination section (2) is comprised of a lens (6), a reduction section (7), and an image-formation section of an imaging element (8). The illumination section (1) irradiates illumination light from a plurality of light sources provided under the piercing section (9) of the finger putting section (3). Instead, the light from a point light source is reflected by concave mirror arranged below the light source. A semi-transmissive mirror is arranged between the piercing hole (9) and the illumination section (1), and the imaging section (2) is arranged in a lateral direction under the finger putting section. The light is irradiated from the illumination section (1) to the finger through the semi-transmissive mirror, and the light reflected by the fingerprint pattern is reflected by the semi-transmissive mirror, and then received by the imaging section (2).

Also, a fingerprint verifying apparatus is disclosed in Japanese Utility Model registration No. 3,032,679. In this reference, light from a green light source (LED) irradiates a glass plate to which a finger is pushed. A fingerprint image is detected from the reflected light by a CCD camera and compared with true fingerprint images. A sensor is provided in the neighborhood of the glass plate to detect the existence of the finger.

SUMMARY OF THE INVENTION

Therefore, an object of the present invention is to provide a fingerprint verifying apparatus with a small size and a method of using a fingerprint verifying apparatus with a small size.

In an aspect of the present invention, a fingerprint verifying apparatus includes first and second light emitting devices, an imaging unit, a fingerprint verifying circuit and a drive switch. The first light emitting device emits first light of a first color, and the second light emitting device emits second light of a second color. The imaging unit detects an image of a fingerprint of a finger from the first light reflected by a finger. The fingerprint verifying circuit has registered fingerprint images, and compares the detected fingerprint image and each of the registered fingerprint images to determine whether the detected fingerprint image is coincident with any of the registered fingerprint images, and outputs a match signal when the detected fingerprint image is coincident with any of the registered fingerprint images. The drive switch turns on the second light emitting device in response to the match signal.

The fingerprint verifying apparatus may further include a third light emitting device which emits third light of a third color. The fingerprint verifying circuit outputs a mismatch signal when the detected fingerprint image is not coincident with any of the registered fingerprint images, and the drive switch turns on the third light emitting device in response to the mismatch signal.

In this case, it is desirable that the first to third colors are different from each other. More desirably, the second color is of a cool color system, and the third color is of a warm color system, and the first color is of a middle color system between the cool color system and the warm color system.

Also, the fingerprint verifying apparatus may further include a first blink circuit provided between the second light emitting device and the drive switch. The first blink circuit blinks the second light when the second light emitting device is turned on.

Also, the fingerprint verifying apparatus may further include a second blink circuit provided between the third light emitting device and the drive switch. The second blink circuit blinks the third light when the third light emitting device is turned on.

Also, the fingerprint verifying apparatus may further include a power supply circuit which supplies power, and a first switch provided between the power supply circuit and the fingerprint verifying circuit to supply the power from the power supply circuit to the fingerprint verifying circuit in response to a detection signal. The drive switch supplies the power from the power supply circuit to the first to third light emitting device in response to the detection signal. In this case, the fingerprint verifying apparatus may further include a finger detector which detects that the finger is put thereon to generate a detection signal.

Also, the fingerprint verifying apparatus may further include a prism which passes the first to third lights to the finger and the first light reflected by the finger to the imaging unit. The finger detection is put on one plane of the prism, the first to third light emitting devices are provided on a side of another plane of the prism to emit the first to third lights to the prism, and the imaging unit is provided on a side of another plane of the prism to receive the reflected first light.

Also, the imaging unit, the first to third light emitting devices and the finger detector may be made as a unitary body.

In another aspect of the present invention, a method of verifying a fingerprint of a finger, is achieved by (a) turning on a first light emitting device such that first light of a first color is emitted to irradiate the finger; by (b) detecting an image of the fingerprint of the finger; by (c) comparing the detected fingerprint image and each of registered fingerprint images to determine whether the detected fingerprint image is coincident with any of the registered fingerprint images; by (d) generating a match signal when the detected fingerprint image is coincident with any of the registered fingerprint images; and by (e) in response to the match signal, turning off the first light emitting device and turning on the second light emitting device such that second light of a second color is emitted.

Here, the method may further include (f) generating a mismatch signal when the detected fingerprint image is not coincident with any of the registered fingerprint images; and (g) in response to the mismatch signal, turning off the first light emitting device and turning on the third light emitting device such that third light of a third color is emitted.

Also, the method may further include (h) generating a verification impossible when it cannot be determined whether or not the detected fingerprint image is coincident with any of the registered fingerprint images; and (i) continuing the first light emitting device to be turned on, in response to the verification impossible signal.

Also, it is desirable that the first to third colors are different from each other. Especially, it is desirable that the second color is of a cool color system, the third color is of a warm color system, and the first color is of a middle color system between the cool color system and the warm color system.

Also, the step of (e) turning on may be achieved by blinking the second light when the second light emitting device is turned on, and the step of (g) turning on may be achieved blinking the third light when the third light emitting device is turned on.

Also, the method may further include detecting that a finger is present, to generate a detection signal; and activating the steps (a), (c), (d) and (e) in response to the detection signal.

DESCRIPTION OF THE PREFERRED EMBODIMENTS

Hereinafter, a fingerprint verifying apparatus according to the present invention will be described with reference to the attached drawings.

Figure 1:
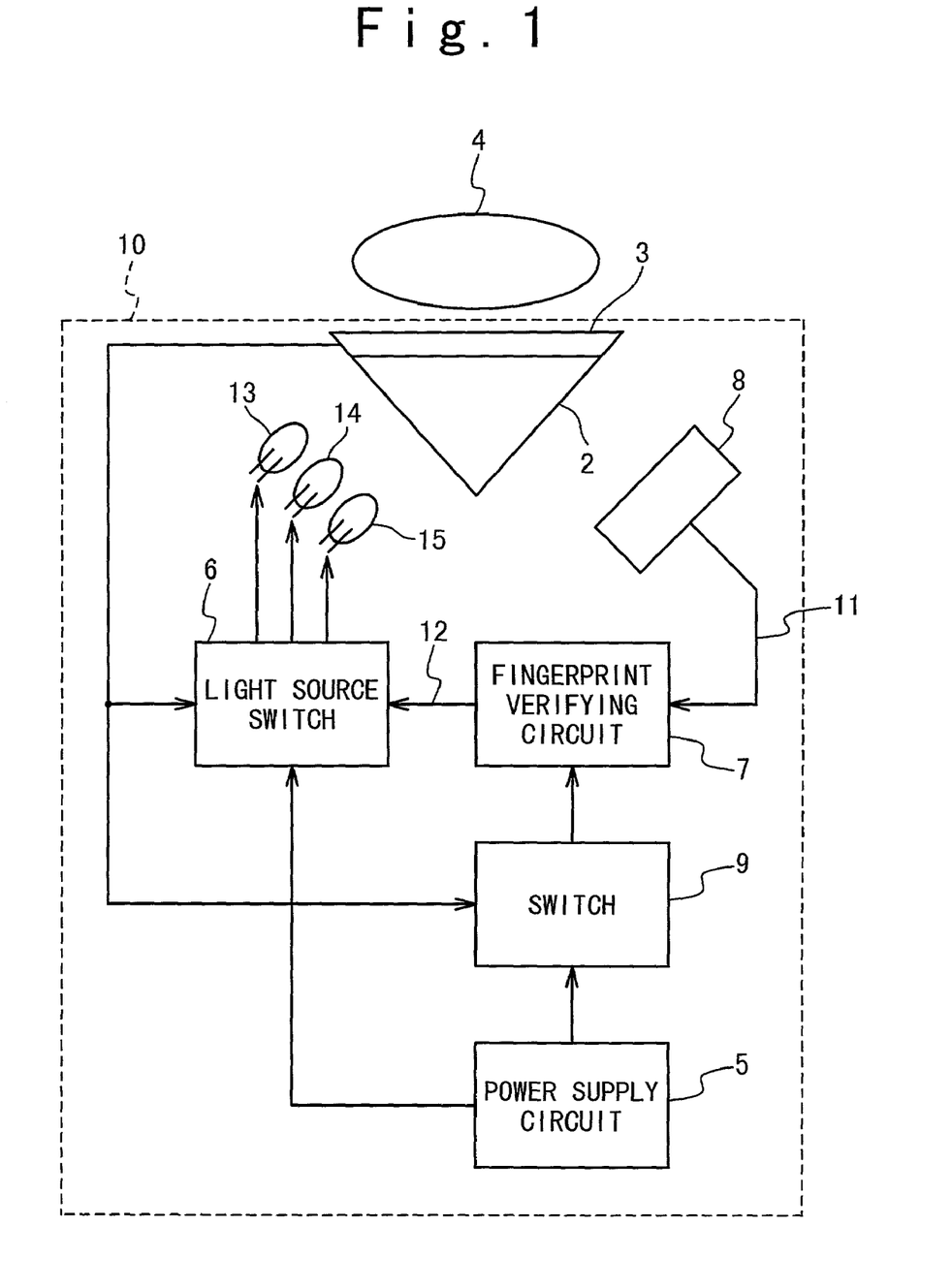
FIG. 1 is a circuit block diagram showing the circuit structure of a fingerprint verifying apparatus according to a first embodiment of the present invention.

FIG. 1 shows the circuit structure of a fingerprint verifying apparatus according to the first embodiment of the present invention. Referring to FIG. 1, a fingerprint verifying apparatus 10 is comprised of a prism 2, a finger detector 3, a power supply circuit 5, a light source switch (drive switch) 6, a fingerprint verifying circuit 7, a photo sensor 8, a unit switch 9, and first to third light emitting devices 13 to 15 such as LEDs.

The finger detector 3 is a transparent touch panel sensor which has a transparent electrically conductive film. The finger detector 3 is provided above one plane of the prism 2 as a unitary body in this embodiment. However, the finger detector 3 may be provided separately from the prism 2. The finger detector 3 is connected to the light source switch 6 and the unit switch 9, and generates a finger existence detection signal to the light source switch 6 and the unit switch 9, when a finger is put on the finger detector 3.

The light source switch 6 supplies the power from the power supply circuit 5 to any of the first to third light emitting devices 13 to 15 in response to the finger existence detection signal. As a result, the light emitting devices 13 to 15 are selectively lit up. Also, the unit switch 9 supplies the power from the power supply circuit 5 to the fingerprint verifying circuit 7 in response to the finger existence detection signal. As a result, the fingerprint verifying circuit 7 starts the fingerprint checking operation of the fingerprint of the finger put on the finger detector 3.

The first light emitting device 13 emits the first light of the first color, a second light emitting device 14 emits the second light of a second color, and a third light emitting device 15 emits the third light of a third color. The first to third colors are different from each other. The first to third light emitting device 13 to 15 are provided above a lower position apart from the prism 2 to be parallel to one plane of the prism 2. Thus, the light emitted from each of the first to third light emitting device 13 to 15 is irradiated to the prism 2 at an about right angle, and the light reflected from the finger 4 is outputted from another plane of the prism 2 and supplied to the photo detector 8.

The photo sensor 8 is provided on a lower position apart from the prism 2 on the opposite side to the light emitting devices 13 to 15 to be parallel to another plane of the prism 2. The photo sensor 8 detects the fingerprint of the finger 4 put on the finger detector 3 from the reflected light outputted from the other plane of the prism 2 to detect a fingerprint image 11. The fingerprint verifying circuit 7 has fingerprint images registered previously. The fingerprint verifying circuit 7 compares the produced fingerprint image 11 and the registered fingerprint images to determine whether or not one of the registered fingerprint images is coincident with the produced fingerprint image 11. When the coincidence is confirmed, the fingerprint verifying circuit 7 outputs a match signal 12. When the coincidence is not confirmed, the fingerprint verifying circuit 7 outputs a mismatch signal 12. The match and mismatch signals 12 are supplied to the light source switch 6. The light source switch 6 turns on any of the first to third light emitting devices in response to the match signal or the mismatch signal 12.

Figure 2:
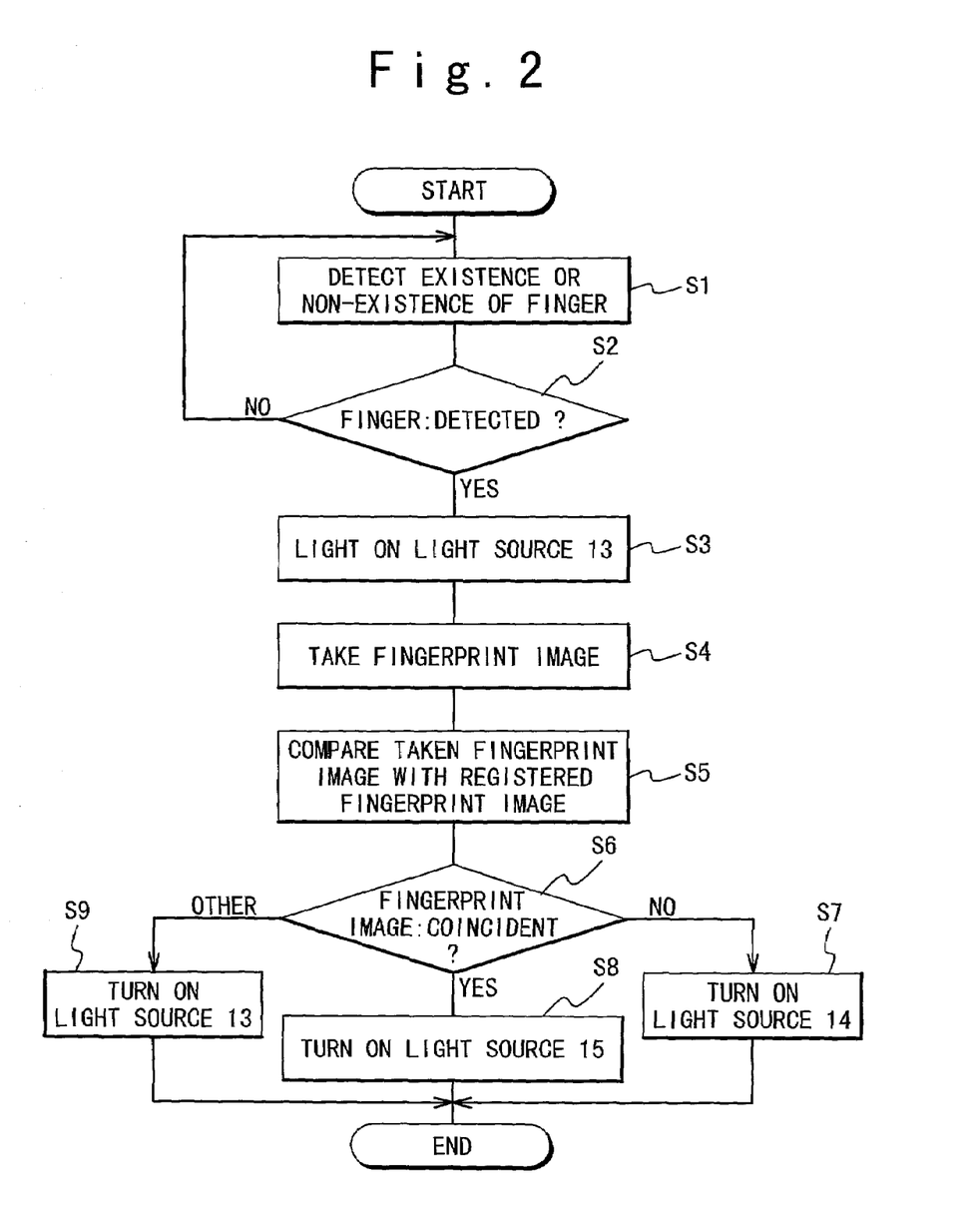
FIG. 2 is a flow chart showing an operation of the fingerprint verifying apparatus according to the first embodiment of the present invention.

FIG. 2 shows an operation of the fingerprint verification apparatus according to the first embodiment of the present invention. The finger detector 3 always monitors the existence of the finger 4 (Steps S1 and S2). When the finger 4 is put on the finger detector 3, the finger detector 3 detects the existence of the finger 4 to generate the finger existence detection signal (step S2). The finger existence detection signal is supplied to the light source switch 6 and the unit switch 9. In response to the finger existence detection signal, a first switching section of the light source switch 6 is activated to supply the power from the power supply circuit 5 to the first light emitting device 13 to drive it. The first light emitting device 13 emits the first light of the first color to the finger 4 through the prism 2 and the finger detector 3 and the first light is reflected by the finger 4. The reflected light is irradiated to the photo sensor 8 through the finger detector 3 and the prism 2, and the photo sensor 8 detects the fingerprint of the finger 4 to produce a fingerprint image (Step S4). The photo sensor 8 outputs the produced fingerprint image to the fingerprint verifying circuit 7.

The unit switch 9 activates to supply the power from the power supply circuit 5 to the fingerprint verifying circuit 7 to drive it, in response to the finger existence detection signal from the finger detector 3. Thus, the fingerprint verifying circuit 7 is turned on at the same time as the first light source 13 emits the first light. The fingerprint verifying circuit 7 starts the fingerprint verifying operation in response to the reception of the produced fingerprint image (Step S5). In the fingerprint verifying operation, the fingerprint verifying circuit 7 compares the produced fingerprint image and the fingerprint images registered previously. When determining that the produced fingerprint image of the finger 4 is not coincident with any of the registered fingerprint images is not registered (No in step S6), the fingerprint verifying circuit 7 outputs a mismatch signal to the light source switch 6. In response to the mismatch signal, the first switching section (not shown) of the light source switch 6 turns off the first light emitting device 13 and a second switching section (not shown) of the light source switch 6 turns on the second light emitting device 14 for a predetermined time period (step S7). As a result, the second light of the second color is emitted to a person with the finger 4 through the prism 2 and the finger detector 3. Then, the second switching section turns off the second light emitting device 14 and the fingerprint verifying apparatus returns to a finger detecting operation of the steps S1 and S2.

When determining that the produced fingerprint image of the finger 4 is coincident with any of the registered fingerprint images is registered (YES in step S6), the fingerprint verifying circuit 7 outputs a match signal to the light source switch 6. In response to the match signal, the first switching section (not shown) of the light source switch 6 turns off the first light emitting device 13 and a third switching section (not shown) of the light source switch 6 turns on the third light emitting device 15 for a predetermined time period (step S8). As a result, the third light of the third color is emitted to a person with the finger 4 through the prism 2 and the finger detector 3. Then, the third switching section turns off the second light emitting device 14 and the fingerprint verifying apparatus returns to a finger detecting operation of the steps S1 and S2.

When the fingerprint verifying circuit 7 cannot determine whether the produced fingerprint image of the finger 4 is coincident with any of the registered fingerprint images is registered (Other in step S6), the fingerprint verifying circuit 7 outputs a verification impossible signal to the light source switch 6. In response to the verification impossible signal, the first switching section (not shown) of the light source switch 6 continues to turn on the first light emitting device 13 for a predetermined time period (step S9). As a result, the first light of the first color is emitted to a person with the finger 4 through the prism 2 and the finger detector 3. Then, the first switching section turns off the first light emitting device 13 and the fingerprint verifying apparatus returns to a finger detecting operation of the steps S1 and S2.

It is desirable that the first color of the first light emitted from the first light emitting device 13 is a yellow system like an orange color. Also, it is desirable that the second color of the second light emitted from the second light emitting device 14 is a warm color system like a red color or a purple color. It is desirable that the third color of the third light emitted from the third light emitting device 15 is a cool color system like a blue color or a green color. The warm color system is widely recognized as a warning color or a danger alarming color internationally, and is suitable to notify the verification failure to the user intuitively. The cool color system is widely recognized as a safe indication color to recall success internationally, and is suitable to notify the verification success to the user intuitively. The yellow color system is a middle color between the cool color system and the warm color system, and is suitable for the ambiguous expression when the verification failure and the verification success cannot be determined. The above three colors are used as the signal colors for the opening and closing of the gate based on the fingerprint verification result. By giving the emitted light colors emitted from the three light emitting devices linguistic meanings, a display unit such as a liquid crystal display can be omitted in the fingerprint verifying apparatus in the first embodiment.

The first light of the first color emitted from the first light emitting device 13 is used as the illumination light for the finger 4, in addition to the previously mentioned notation. It is not necessary to provide a separate light source for the illumination of the fingerprint image. Therefore, the reduction of the fingerprint verifying apparatus in size can be made possible.

Figure 3:
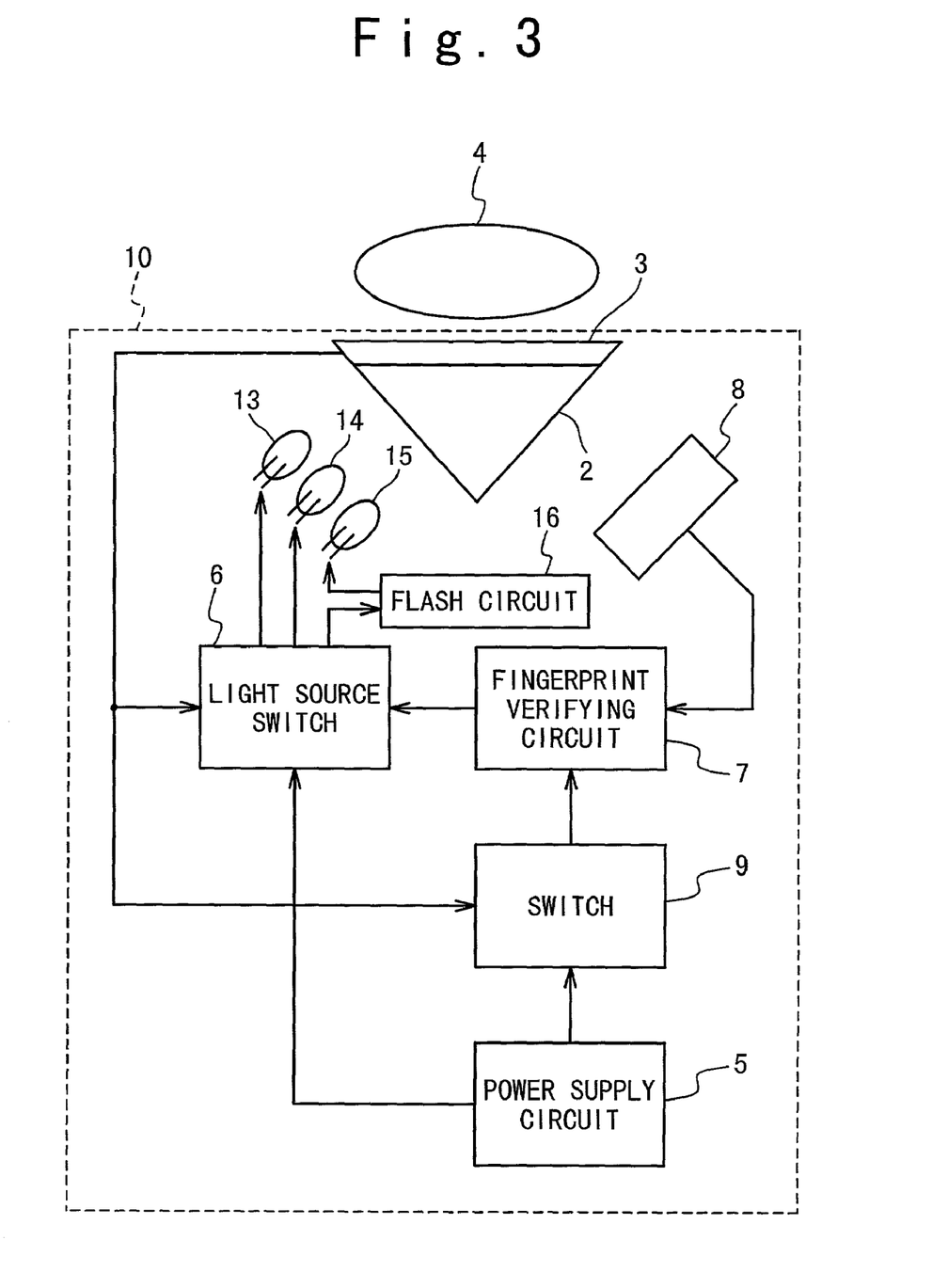
FIG. 3 is a circuit block diagram showing the circuit structure of the fingerprint verifying apparatus according to a second embodiment of the present invention.

FIG. 3 shows the fingerprint verifying apparatus according to the second embodiment of the present invention. The fingerprint verifying apparatus according to the second embodiment is different from that of the first embodiment in that a blink circuit 16 is added between the third switching section of the light source switch 6 and the third light emitting device 15. In case of the verification success, the fingerprint verifying circuit 7 outputs the match signal to the light source switch 6. The third switching section of the switch 6 supplies the power from the power supply circuit 5 to the blink circuit 16. Thus, the third light emitted from the third light emitting device 15 is blinked by the blink circuit to indicate the verification success. Through the blink, the meaning of the third light is emphasized. The blink circuit 16 may be modified such that the third light emitting device 15 always emits the third light normally and is changed to blink in case of the verification success. Such a modification may be applied to the first light emitting device 13 or the second light emitting device 14. In this case, the first light emitting device 13, the second light emitting device 14 or the third light emitting device 15 is turned on normally and the first light emitting device 13 is blinked in the verification impossible case, the second light emitting device 14 is blinked in case of the verification failure, and the third light emitting device 15 is blinked in case of the verification success.

Figure 4:
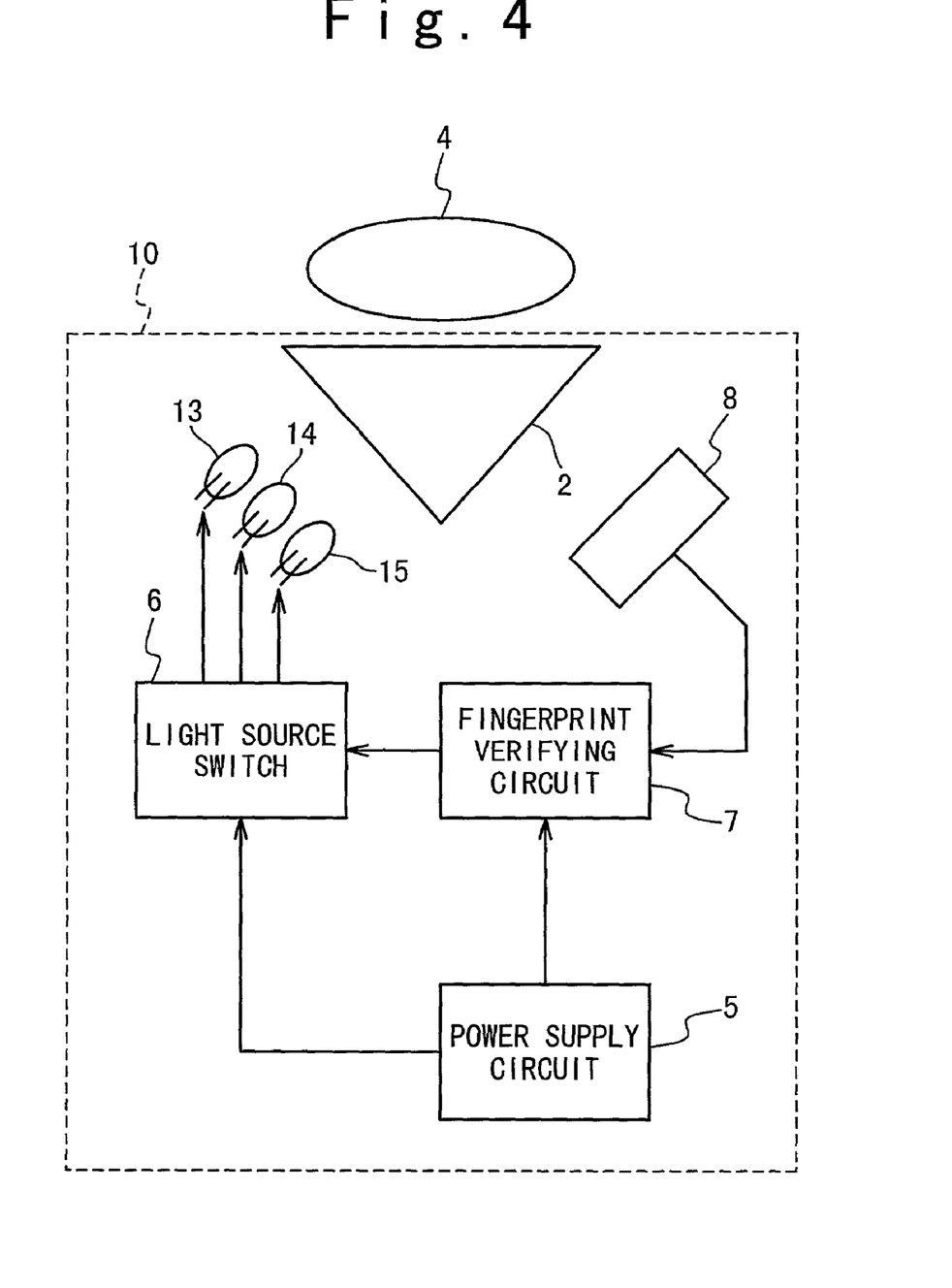
FIG. 4 is a circuit block diagram showing the circuit structure of the fingerprint verifying apparatus according to a third embodiment of the present invention.

FIG. 4 shows the fingerprint verification apparatus according to the third embodiment of the present invention. The fingerprint verification apparatus in the third embodiment is different from that in the first embodiment of FIG. 1 in that the finger detector 3 is omitted and the apparatus unit switch 9 is also omitted. In the third embodiment, any one of the three light emitting devices 13 to 15 is turned on normally, e.g., the first light emitting device 13 is always lit up. Until a right fingerprint is detected, the fingerprint verifying operation is always repeated. In the third embodiment, the power consumption increases but the price of the whole apparatus can be suppressed low by the reduction of the number of parts. Also, the apparatus can be made smaller.

Figure 5:
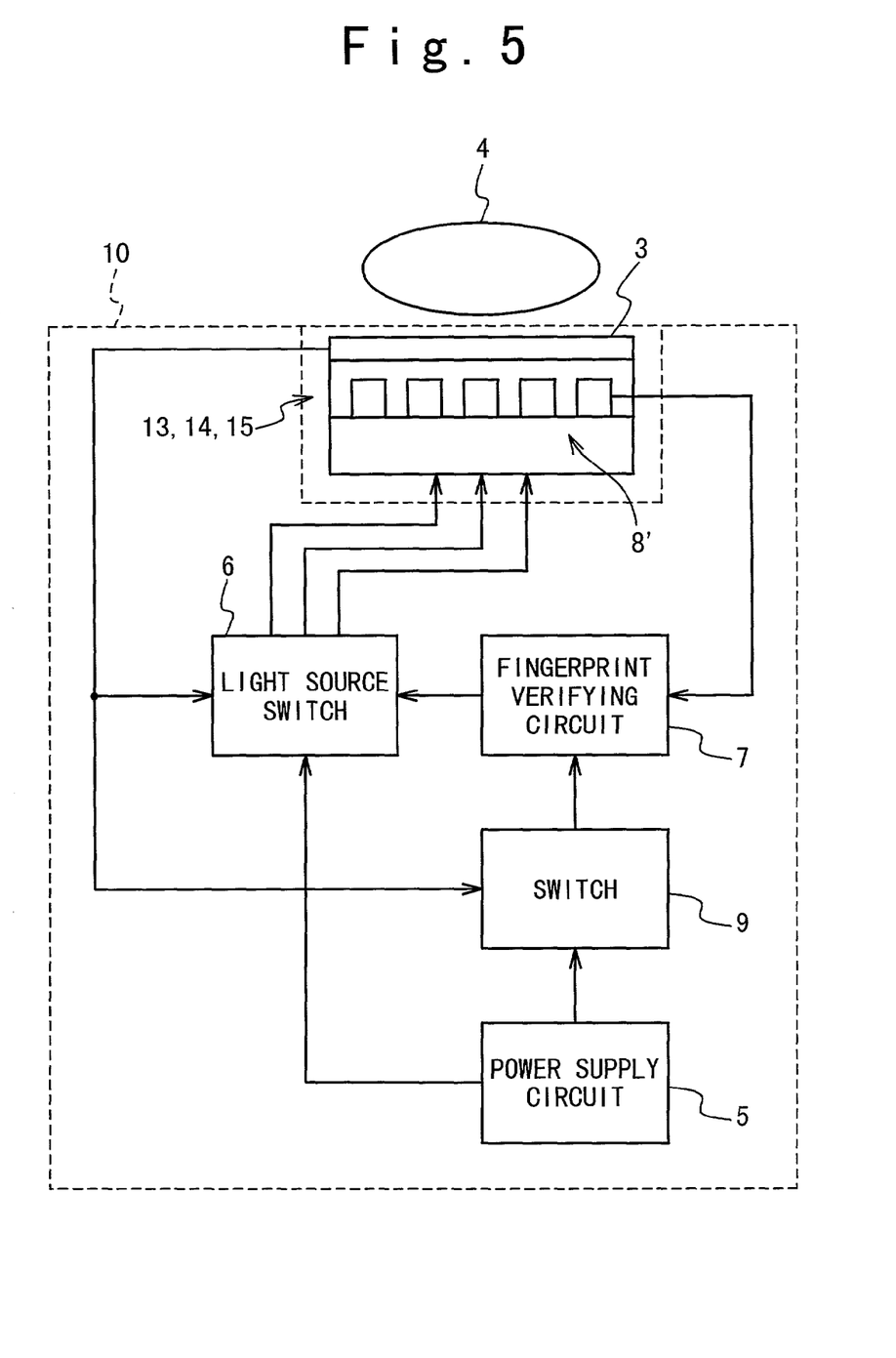
FIG. 5 is a circuit block diagram showing the circuit structure of the fingerprint verifying apparatus according to a fourth embodiment of the present invention.

FIG. 5 shows the fingerprint verification apparatus according to the fourth embodiment of the present invention. The fingerprint verification apparatus in the fourth embodiment does not use the prism 2 and uses a thin type fingerprint sensor. The thin type fingerprint sensor is comprised of a finger detector 3, a photo sensor 8' embedded in the fingerprint sensor, and the first to third light emitting devices 13, 14 and 15. The photo sensor 8' is arranged on the back side of the finger detector 3, and the light emitting devices 13, 14 and 15 are arranged on the side of the photo sensor 8' and give backlight to the finger detector 3. In this way, it is possible to avoid that the apparatus becomes thick, by using the thin type light source and photo sensor.

In the fingerprint verifying apparatus and a method of operating the fingerprint verifying apparatus according to the present invention, it can be avoided that the whole apparatus is made large in size through the use of a large display unit.

What is claimed is:

1. A fingerprint verifying apparatus comprising:
    a first light emitting device which emits first light of a first color;
    a second light emitting device which emits second light of a second color;
    an imaging unit which detects an image of a fingerprint of a finger from said first light reflected by a finger;
    a fingerprint verifying circuit which has registered fingerprint images, and compares said detected fingerprint image and each of said registered fingerprint images to determine whether said detected fingerprint image is coincident with any of said registered fingerprint images, and outputs a match signal when said detected fingerprint image is coincident with any of said registered fingerprint images, and outputs a verification impossible signal when it cannot be determined whether or not said detected fingerprint image is coincident with any of said registered fingerprint images and continues said first light emitting device to be turned on in response to said verification impossible signal; and
    a drive switch which turns on said second light emitting device in response to said match signal.

2. The fingerprint verifying apparatus according to claim 1, further comprising:
    a third light emitting device which emits third light of a third color, and
    said fingerprint verifying circuit outputs a mismatch signal when said detected fingerprint image is not coincident with any of said registered fingerprint images, and
    said drive switch turns on said third light emitting device in response to said mismatch signal.

3. The fingerprint verifying apparatus according to claim 2, wherein said first, second and third colors are different from each other.

4. The fingerprint verifying apparatus according to claim 3, wherein said second color is of a cool color system, and said third color is of a warm color system.

5. The fingerprint verifying apparatus according to claim 4, wherein said first color is of a middle color system between the cool color system and the warm color system.

6. The fingerprint verifying apparatus according to claim 1, further comprising:
    a first blink circuit provided between said second light emitting device and said drive switch, and
    wherein said first blink circuit blinks said second light when said second light emitting device is turned on.

7. The fingerprint verifying apparatus according to claim 2, further comprising:
    a second blink circuit provided between said third light emitting device and said drive switch, and
    wherein said second blink circuit blinks said third light when said third light emitting device is turned on.

8. The fingerprint verifying apparatus according to claim 2, further comprising:
    a power supply circuit which supplies power; and
    a first switch provided between said power supply circuit and said fingerprint verifying circuit to supply the power from said power supply circuit to said fingerprint verifying circuit in response to a detection signal, and
    wherein said drive switch supplies the power from said power supply circuit to said first, second or third light emitting device in response to said detection signal.

9. The fingerprint verifying apparatus according to claim 8, further comprising:
    a finger detector which detects that said finger is put thereon to generate a detection signal.

10. The fingerprint verifying apparatus according to claim 2, further comprising:
    a prism which passes said first, second and third lights to said finger and said first light reflected by the finger to said imaging unit, and
    wherein said finger detection is put on one plane of said prism, said first, second and third light emitting devices are provided on a side of a second plane of said prism to emit said first, second or third lights to said prism, and said imaging unit is provided on a side of a third plane of said prism to receive said reflected first light.

11. The fingerprint verifying apparatus according to claim 2, wherein said imaging unit, said first, second and third light emitting devices and said finger detector are made as a unitary body.

12. A method of verifying a fingerprint of a finger, comprising the steps of:
    (a) turning on a first light emitting device such that first light of a first color is emitted to irradiate said finger;
    (b) detecting an image of said fingerprint of said finger;
    (c) comparing said detected fingerprint image and each of registered fingerprint images to determine whether said detected fingerprint image is coincident with any of said registered fingerprint images;
    (d) generating a match signal when said detected fingerprint image is coincident with any of said registered fingerprint images;
    (e) in response to said match signal, turning off said first light emitting device and turning on a second light emitting device such that a second light of a second color is emitted;
    (f) generating a verification impossible signal when it cannot be determined whether or not said detected fingerprint image is coincident with any of said registered fingerprint images; and
    (g) continuing said first light emitting device to be turned on, in response to said verification impossible signal.

13. The method according to claim 12, further comprising the steps of:
    (h) generating a mismatch signal when said detected fingerprint image is not coincident with any of said registered fingerprint images; and
    (i) in response to said mismatch signal, turning off said first light emitting device and turning on said third light emitting device such that third light of a third color is emitted.

14. The method according to claim 13, wherein said first, second and third colors are different from each other.

15. The method according to claim 14, wherein said second color is of a cool color system, and said third color is of a warm color system.

16. The method according to claim 15, wherein said first color is of a middle color system between the cool color system and the warm color system.

17. The method according to claim 13, wherein said step of (e) turning on comprises the step of:
    blinking said second light when said second light emitting device is turned on, and said step of (i) turning on comprises the step of:
blinking said third light when said third light emitting device is turned on.

18. The method according to claim 12, further comprising the steps of:
detecting that a finger is present, to generate a detection signal; and
activating said steps (a), (c), (d) and (e) in response to said detection signal.

19. The method according to claim 12, wherein said step of (g) comprises continuing to turn on said first light emitting device for a predetermined time period.

20. The fingerprint verifying apparatus according to claim 1, wherein said verifying circuit continues to turn on said first light emitting device for a predetermined time period in response to said verification impossible signal.

* * * * *